Feb. 6, 1940.   M. J. KALOUS   2,189,363
PROCESS AND APPARATUS FOR WORKING UP NITROUS GASES TO NITRIC ACID
Filed May 27, 1938
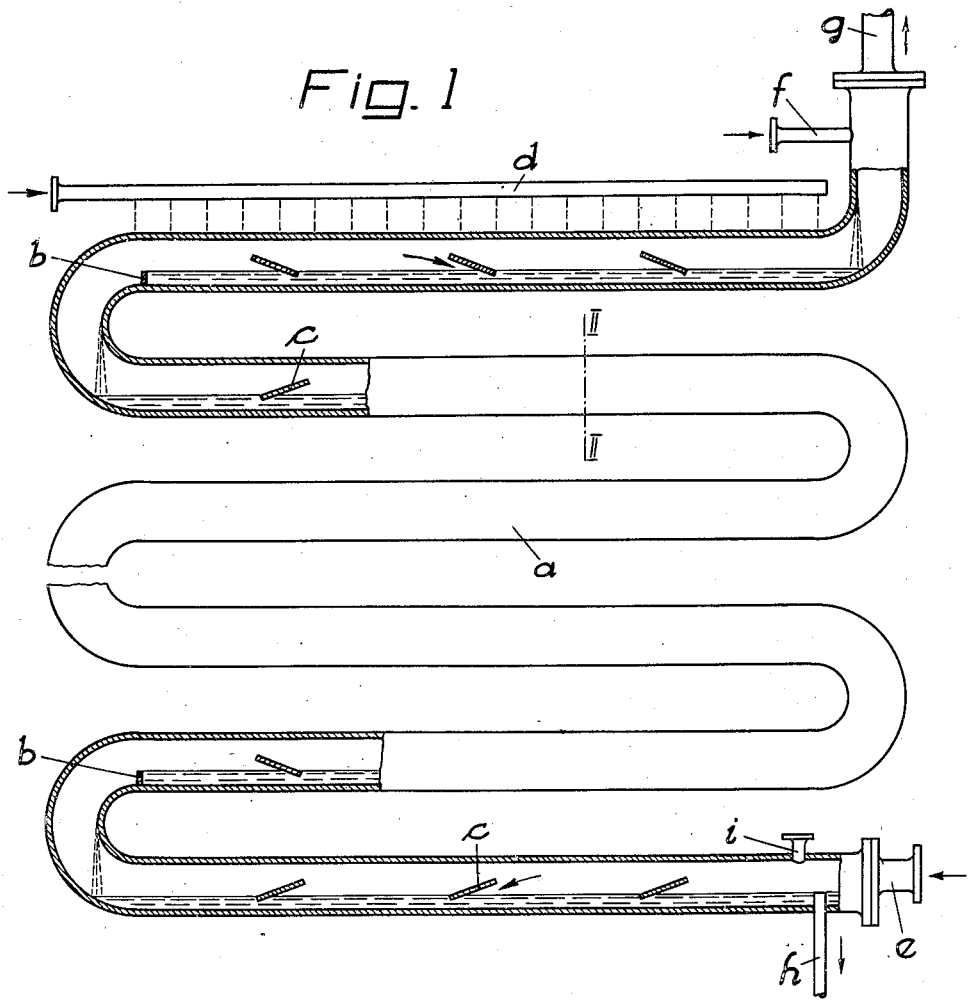
Fig. 1
Fig. 2
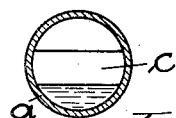
Inventor
Mieczyslaw J. Kalous
Atty.

Patented Feb. 6, 1940

2,189,363

UNITED STATES PATENT OFFICE 2,189,363

PROCESS AND APPARATUS FOR WORKING UP NITROUS GASES TO NITRIC ACID

Mieczyslaw Joseph Kalous, London, England

Application May 27, 1938, Serial No. 210,545
In the Netherlands April 11, 1938

2 Claims. (Cl. 23—160)

The absorption of nitrous gases (e. g. from the oxidation of ammonia) in water was previously carried out in successive stages. In the absorption reaction, as is known, NO is formed; the NO forming in the individual absorption stages must then be again oxidised to $NO_2$ in the gaseous phase between two successive absorption stages. This oxidation reaction proceeds rather slowly and is still further delayed by the heat of the reaction. This reaction heat must therefore be rapidly removed by effective cooling. The heat from the absorption reaction, i. e. from the liquid phase, may be removed relatively easily. The removal of the heat from the oxidation reaction is not so simple since the reaction takes place in the presence of large quantities of inert gas in extensive gas spaces in order to allow the NO sufficient time for its oxidation.

In order to diminish the large size and the high costs of the absorption apparatus it has already been proposed to carry out the absorption under pressure, at about 3–6 atmospheres. The absorption under pressure was likewise carried out in stages and in absorption columns similar to rectification columns. The customary bell-shaped elements or the like of these columns secure a good contact between gas and liquid, the absorption liquid collecting on the individual floors is cooled at each stage by built in cooling tubes. The cooling of the gas spaces or of the gases transiently present between the individual stages or floors, i. e. the cooling just of those spaces in which the oxidation reaction takes place, is however not very satisfactory.

In my application Serial No. 166,404 I have already proposed for the absorption the use of individual superposed horizontally arranged tube elements of small diameter. These tube elements are connected together by liquid overflow tubes and gas conduits. Below the fluid level in each element is located a gas distribution tube directed lengthwise with downwardly directed outlet openings. By outside cooling by means of running water not only may the liquid layers be effectively cooled, but in particular also the large surfaced gas spaces of the individual tube elements, with rapid removal of the heat oxidation developed therein. By this means with respect to the previously proposed absorption apparatus important savings in the costs of the plant and in the space requirements are obtained, but certain disadvantages are still associated with this apparatus which are particularly connected with the fact that the reactions are carried out in stages.

The carrying out of the absorption in these successive stages is disadvantageous in so far as in the individual stages the desired countercurrent principle is only partly i. e. deficiently carried out, and in fact only between the average products of the individual stages, in other words the countercurrent itself is carried out in stages, and further in that some unoxidised NO passes from one stage through the fluid layer of the succeeding stage into the gas space of the latter, whereby this is overloaded, which readily leads to disturbances.

The present invention is concerned with a process and a device by which this disadvantage is overcome by carrying out the absorption, while maintaining the advantages of the tubular formation of the apparatus, not in stages but in a single stage in uninterrupted countercurrent. In this method of working the gas distribution conduits in the fluid layers are dispensed with as well as the separate leads for the supply and removal of gas and fluid between the individual stages, whereby further considerable savings both in apparatus and assembly costs are obtained as well as in space requirements and in the previously wasted space.

For carrying out the process an upright zig-zag tubular duct of suitable length and relatively small diameter is employed, the runs between the bends being horizontal or substantially horizontal. The gases enter the duct from the bottom end thereof and the absorption liquid is fed from above. The liquid flows in thin layers whose thickness may be regulated, e. g. by weirs in the horizontal runs along the bottom of the tube in countercurrent to the gas. In order to increase the contact between gas and liquid there are arranged according to the invention in the horizontal lengths of the duct at certain distances apart baffle plates which dip into the liquid layer leaving a part of the cross section of the duct free above and below them. On imparting to the gas stream a suitable high speed part of the gas will be forced by the baffle plates to impinge upon the liquid surface and by the kinetic energy of the gas stream the liquid will be sprayed into the gas space whereby the contact between gas and liquid is greatly favored.

The invention is illustrated in the accompanying drawing in which Figure 1 is a side elevation of an apparatus for carrying out the process according to the invention. Figure 2 is a cross section on the line II—II of Figure 1.

In the runs of the zig-zag tube $a$ lying below one another in the same perpendicular plane and being of a considerable length in proportion to the bends of the tube, which runs are either horizontal or slope very slightly downwardly in the direction of movement of the liquid, are weirs *b* for the maintenance of a small thickness of liquid layer. The baffle plates *c* are immersed to a certain depth below the liquid surface without preventing the flow of the absorption fluid. On the other hand they leave a part of the cross section above them free for the unhindered flow of gas. For cooling the outer surface of the zig-zag tube a water spraying pipe *d* or the like is used. The gas flows in below through the connection *e* and the water is fed from above through the tube *f*. The inert gases are led out through the connection *g* and the concentrated acid flows through tube *h* into the acid container which is not shown. Through connection *i* secondary air or oxygen may be fed in.

The runs of tube shown in Figure 1 could also run slightly upwards in the direction of the movement of the liquid, in which case the weirs *b* would be at least partly replaced or might be dispensed with.

In the absorption apparatus in question the acid concentration increases continuously from point to point in the direction of liquid movement. The NO formed in the absorption is likewise immediately upon its formation continuously oxidised and absorbed. The effective cooling of the tubular duct is likewise easy to carry out since with the method according to the invention there are no wasted parts, i. e. parts in which no reaction takes place, and even the curves act as cooled reaction spaces.

In the simplest and cheaply manufactured absorption apparatus according to the invention, for example with the use of a tube of 300 mm. diameter and 670 metres total length, that is to say with a space content of about 47 cubic metres, and with a pressure of 6 atmospheres—for which a wall thickness of 2 mm. is sufficient—a daily production of 24,000 kgs. of nitric acid—calculated as 100% $HNO_3$—can be obtained. The cooling surfaces of the tube described amount to 632 square metres. Due to the effective cooling made possible the gases from the oxidation of ammonia may be absorbed up to 99%.

I claim:

1. A single-stage process for the absorption of nitrous gases consisting in passing the gases under pressure in countercurrent to the absorption liquid streaming beneath them through a cooled tubular duct with substantially horizontal runs, directing part of the gases at intervals against a forwardly and downwardly inclined baffle extending below the liquid surface, said baffle thus partially but not completely obstructing the flow of both the gases and the absorption liquid, and giving the streaming gases a rate of flow which on impinging of the gases upon the baffle causes a part of the gas to pass above the baffles and a part to pass under the liquid and causes the liquid to be sprayed by the kinetic energy of the gas into the gas space.

2. Apparatus for the absorption of nitrous gases comprising an upright zig-zag tubular duct of pressure-resistant material with substantially horizontal runs between the bands, means for water-cooling the outside of said duct, an inlet for the absorbing liquid and an outlet for the residual gas at the upper end of said duct, an outlet for the liquid containing absorbed gas and an inlet for fresh gas at the lower end of said duct, means for maintaining a definite predetermined liquid level in the ducts, and baffle plates in said duct arranged to slope downwards in the direction of the gas flow and extending below the surface of the liquid but not completely obstructing either gas or liquid flow so as to cause part of the gas to impinge upon the liquid surface but to leave a part of the cross section of the duct free above and below them so as to allow of an undeviated flow of the remaining gas and of the liquid respectively.

MIECZYSLAW JOSEPH KALOUS.